United States Patent [19]

Miyano

[11] Patent Number: 5,781,281
[45] Date of Patent: Jul. 14, 1998

[54] DISTANCE MEASURING INFRARED PROJECTION SYSTEM

[75] Inventor: Hitoshi Miyano, Omiya, Japan

[73] Assignee: Fuji Photo Optical Co., Ltd., Omiya, Japan

[21] Appl. No.: 620,842

[22] Filed: Mar. 20, 1996

[30] Foreign Application Priority Data

May 30, 1995 [JP] Japan ..................... 7-155175

[51] Int. Cl.⁶ ................. G01C 3/08; G03B 13/00
[52] U.S. Cl. ........................ 356/40.1; 396/106
[58] Field of Search .................. 356/4.01–5.15; 396/106

[56] References Cited

U.S. PATENT DOCUMENTS 4,716,284 12/1987 Tanaka .
4,818,865 4/1989 Matsui et al. .
4,972,216 11/1990 Ueda et al. .

OTHER PUBLICATIONS

Shashin Kogyo (Photo Industry) Special Issue, Kamera Renzu Hyakka (Camera Lens Encyclopedia), Apr. 20, 1983 in Japanese Language and English Translation.

Primary Examiner—Stephen C. Buczinski
Attorney, Agent, or Firm—Ronald R. Snider

[57] ABSTRACT

In a finder lens system having a zooming function, a distance measuring infrared projection system having its own zooming function is disposed such that the beam diameter of the emitted infrared ray becomes smaller in telephotographic mode. Accordingly, a sufficient quantity of light can be provided for measuring the distance and judging the projection area. The fifth lens (L5) constituting the infrared projection system has the first surface (facing the finder optical system) disposed at a position distanced from the third lens (L3) by 12.0 mm by way of a half mirror (M). An LED (1) is disposed at a position distanced from the second surface (facing the LED 1) of the fifth lens (L5) by about 13.8 mm.

3 Claims, 2 Drawing Sheets

(INVERSE GALILEAN TYPE)

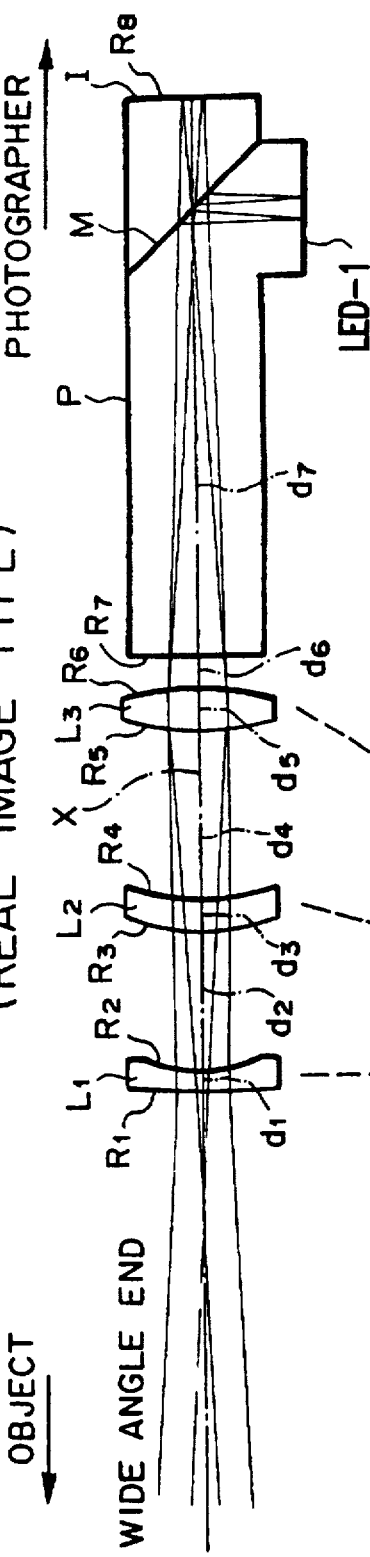
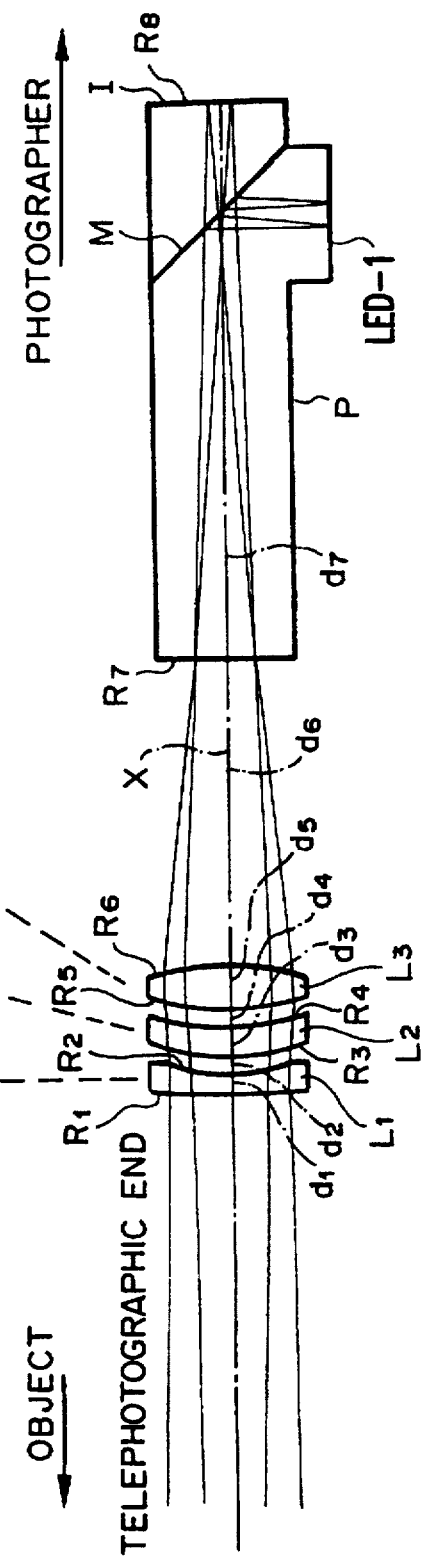
FIG. 2 (REAL IMAGE TYPE)

DISTANCE MEASURING INFRARED PROJECTION SYSTEM

RELATED APPLICATIONS

This application claims the priority of Japanese Patent Application No. 7-155175 filed on May 30, 1995, which is incorporated herein by reference.

BACKGROUND OF THE INVENTION

1. Field of the Invention

The present invention relates to a system for projecting a distance-measuring infrared ray in a compact camera or the like with a zooming function. More specifically, it relates to a distance measuring infrared projection system in which, when an infrared ray is projected onto an object and then light reflected from the object is received so as to detect the angle of deflection of the reflected light and an image position and thereby to measure a distance, this infrared ray can be effectively projected onto the object.

2. Description of the Prior Art

When the photograph lens system of a camera is a zoom lens, the infrared ray used for measuring the distance has to be projected onto an object placed at a farther position when the zoom lens is in telephotographic mode as compared with wide angle mode. As the distance from the object becomes greater, the intensity of light reflected thereon becomes smaller, thereby making it difficult to measure the distance. In order to overcome this problem, the emission intensity of the infrared ray may be changed. However, such a technique has not yet been used in practice since the emission intensity is hard to stabilize and the configuration of the apparatus would be complicated thereby.

Also, in the projection apparatus incorporated in conventional compact cameras, since its projection area (projection angle) does not change, even when the projection area in wide angle mode is positioned at substantially the center portion of an image, that in telephotographic mode may expand to the whole image area, thereby making it difficult to judge which part of the image is subjected to measurement of the distance.

In order to overcome these problems, the projection system, in itself, may have a zooming function. If the infrared ray projected in telephotographic mode can have a smaller beam diameter, the brightness per unit area will increase in inverse proportion to thus decreased beam diameter.

However, the projection system with such an inherent zooming function may not be easily accommodated in a compact camera due to a spatial limitation therewithin.

Further, a complicated mechanism will be needed for making its photograph system, finder system, and projection system cooperate with each other to effect zooming.

SUMMARY OF THE INVENTION

Under the foregoing circumstances, the object of the present invention is to provide a distance measuring infrared projection system with a simple and compact configuration which can yield a reflected light intensity sufficient for measuring a distance even when zooming is in telephotographic mode.

A first distance measuring infrared projection system in accordance with the present invention comprises a half mirror with a predetermined infrared reflecting characteristic which is disposed between an ocular lens group of an inverse Galilean type finder and an object and an infrared irradiating means which irradiates the half mirror with a predetermined infrared ray from outside of an optical axis of the lens groups constituting the finder.

The inverse Galilean type finder comprises an objective lens group, which has a negative refractive power as a whole, and the ocular lens group, which has a positive refractive power as a whole, while at least two lenses constituting the objective lens group have a variable distance therebetween so as to attain a variable power. The predetermined infrared ray irradiating the half mirror is projected onto the object by way of the half mirror and the objective lens group.

Also, a field frame may be disposed within or near the ocular lens group, while a concave surface of a lens constituting the objective lens group may be configured so as to function as a half mirror for reflecting image light of the field frame toward the ocular lens group, thereby making the system adapt to an albada type finder.

Further, a second distance measuring infrared projection system in accordance with the present invention comprises a half mirror with a predetermined infrared reflecting characteristic which is disposed between an image-forming position of a real image type finder and an object and an infrared irradiating means which irradiates the half mirror with a predetermined infrared ray from outside of an optical axis of the lens groups constituting the finder.

The real image type finder comprises an objective lens group, which has a positive refractive power as a whole, and an ocular lens group, which has a positive refractive power as a whole, while the focal length of the objective lens group is changed so as to attain a variable power. The predetermined infrared ray irradiating the half mirror is projected onto the object by way of the half mirror and the objective lens group.

Thus, the distance measuring infrared projection system in accordance with the present invention has a configuration in which a distance measuring projection lens system is incorporated in a finder lens system which is normally in cooperation with a photograph lens system and which can adapt to each of inverse Galilean, albada, and real image types.

In the above-mentioned configuration, the distance measuring infrared ray is introduced into the finder lens system by the half mirror disposed on the optical axis of the finder lens system. Due to the zooming function of the finder lens system, the beam diameter of the infrared ray emitted from the camera becomes greater and smaller when the camera is set to its wide angle mode and telephotograph mode, respectively. Accordingly, even when set to the telephotographic mode, the projection area is prevented from expanding too widely. Therefore, unlike the prior art, it can be easily judged which part is being measured.

Also, in telephotographic mode, since the infrared ray is emitted from the camera with a beam diameter smaller than that in wide angle mode, the brightness on the object per unit area can be made greater than that conventionally obtained. Accordingly, the light quantity of the infrared ray returning from the object to the camera can be increased, whereby a sufficient quantity of light can be provided for measuring a distance even in telegraphic mode.

BRIEF DESCRIPTION OF THE DRAWINGS

FIG. 2 is a schematic view showing an optical system in which a distance measuring optical system in accordance with the present invention is applied to a real image type finder.

DETAILED DESCRIPTION OF THE PREFERRED EMBODIMENTS

In the following, embodiments of the present invention will be explained with reference to drawings.

(Embodiment 1)

Figure 1:
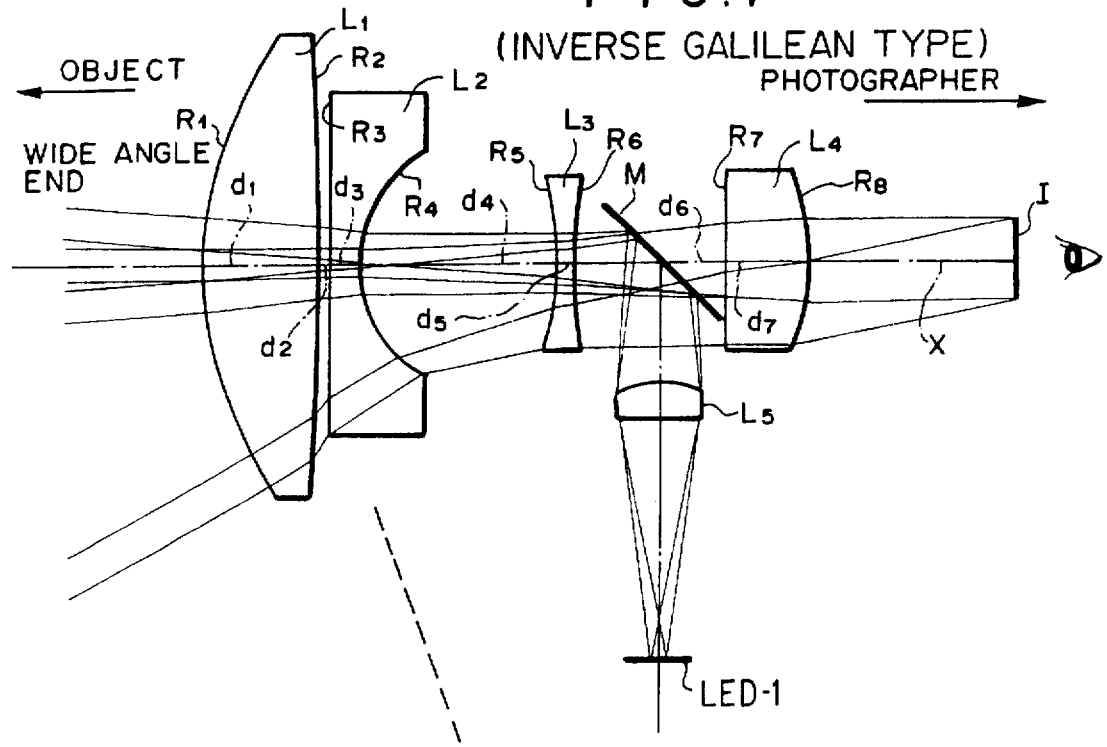
FIG. 1 is a schematic view showing an optical system in which a distance measuring optical system in accordance with the present invention is applied to an inverse Galilean type finder.
Figure 1:
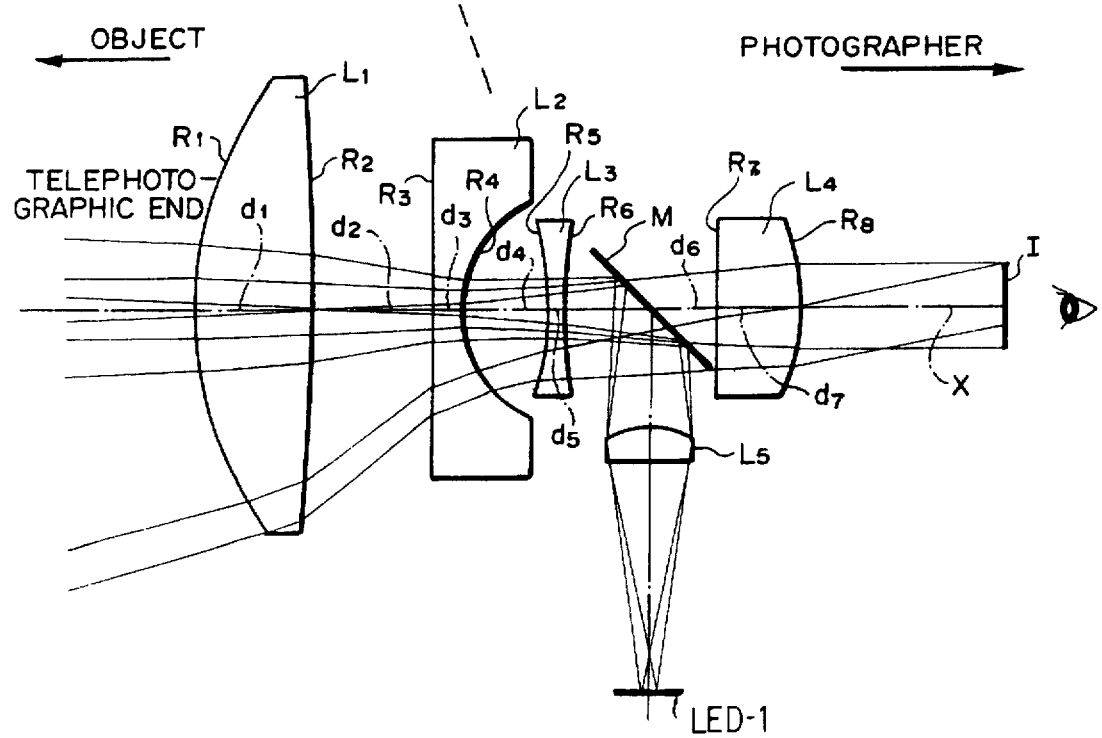

FIG. 1 is a schematic view showing an optical system, in its wide angle end and telephotographic end, in which a distance measuring optical system in accordance with the present invention is applied to an inverse Galilean type (albada type) finder.

Namely, this optical system has a finder optical system comprising a first lens L1, a second lens L2, and a third lens L3, which constitute an objective lens group, as well as a fourth lens L4 constituting an ocular lens group. Also, it has an infrared projection system comprising an infrared LED 1, a fifth lens L5, and a half mirror M.

The above-mentioned objective lens group, as a whole, has a negative refractive power. The first lens L1 is a biconvex lens whose surface having a stronger radius of curvature is directed toward an object. The second lens L2 is a biconcave lens whose surface having a stronger radius of curvature is directed toward a photographer. The third lens L3 is a biconcave lens whose surface having a stronger radius of curvature is directed toward the object.

The ocular lens group has a positive refractive power. The fourth lens L4 is a plane-convex lens whose convex surface is directed toward the photographer.

The image light of the object reaches an eye-point position I of the photographer by way of the above-mentioned objective lens group and ocular lens group.

The above-mentioned infrared projection system comprises the half mirror M disposed on an optical axis X of the finder optical system between the third lens L3 and fourth lens L4, the LED 1 emitting an infrared ray toward the half mirror M, and the fifth lens L5 making this infrared ray, as converged light, impinge upon the half mirror M. The infrared ray from the LED 1 is reflected by the half mirror M toward the objective lens group and then projected by the latter onto the object. The fifth lens L5 is a plane-convex lens whose convex surface is directed toward the finder optical system.

Also, as shown in FIG. 1, the second lens L2 constituting the objective lens group is movable along the optical axis X so as to approach the first lens L1 and the third lens L3 at the wide angle and telephotographic ends, respectively.

The following Table 1 shows radius of curvature R (mm) of each lens surface near the optical axis X, central thickness of each lens or air space between neighboring lenses d (mm), and refractive index N of each lens in this embodiment.

In Table 1, the numbers attached these marks R, d, and N successively increase from the object side.

As mentioned above, since the lens distances d2 and d4 can change upon zooming, these distances at the wide angle and telephotographic ends are also shown in Table 1.

TABLE 1

|   | R | d | N |
|---|---|---|---|
| 1 | 20.388 | 6.71 | 1.58819 |
| 2 | −206.84 | *1 | |
| 3 | 11.512 | 1.68 | 1.58819 |
| 4 | 6.442 | *2 | |
| 5 | −19.769 | 1.04 | 1.49023 |
| 6 | 43.707 | 8.81 | |
| 7 | ∞ | 4.99 | 1.49023 |
| 8 | −13.820 | | |
| | wide angle end | telephotographic end | |
| *1 | 0.60 | 7.27 | |
| *2 | 11.67 | 5.00 | |

In this embodiment, upon the zooming operation based on the movement of the second lens L2, the finder magnification can change from 0.40 to 0.72.

Also, the first surface of the fifth lens L5 (facing the finder optical system) constituting the infrared projection system is disposed at a position which is distanced from the third lens L3 by 12.0 mm by way of the half mirror M. Further, the LED 1 is disposed at a position distanced from the second surface of the fifth lens L5 (facing the LED 1) by about 13.8 mm.

Radius of curvature R (mm) of the fifth lens L5 near the optical axis X, its central thickness d (mm), and refractive index N are shown in the following Table 2:

TABLE 2

|   | R | d | N |
|---|---|---|---|
| 1 | 5.0 | 2.00 | 1.51633 |
| 2 | ∞ | | |

In this embodiment thus configured, when the beam diameter of the infrared ray at the light-emitting portion of the LED 1 is 1 mm, it becomes about 51 cm and about 29 cm on the object distanced therefrom by 3 m at the wide angle and telephotographic ends, respectively.

When the surface (R6) of the third lens L3 facing the photographer is made as a half mirror and a field frame F is formed on the surface (R7) of the fourth lens L4 facing the object such that an image of the field frame is reflected by the half-mirror surface of the third lens L3 and can be seen by the photographer as being superposed on the object image, an albada type finder incorporating a distance measuring infrared projection system therein can be obtained.

(Embodiment 2)

FIG. 2 is a schematic view showing an objective lens optical system and an infrared projection system, in the wide angle end and telephotographic end of the objective lens optical system, in which a distance measuring optical system in accordance with the present invention is applied to a real image type finder.

Namely, this optical system has a finder optical system comprising a first lens L1, a second lens L2, a third lens L3, and a prism P which constitute an objective lens group, as well as an ocular lens group which is not depicted. Also, it has an infrared projection system comprising an infrared LED 1 and a half mirror M.

The above-mentioned objective lens group, as a whole, has a positive refractive power. The first lens L1 is a negative meniscus lens whose concave surface is directed toward a photographer. The second lens L2 is a positive meniscus lens whose concave surface is directed toward the photographer. The third lens L3 is a biconvex lens whose surface having a stronger radius of curvature is directed toward the object.

The ocular lens group has a positive refractive power.

The image light of the object reaches an eye-point position of the photographer by way of the above-mentioned objective lens group and ocular lens group.

The surface of the prism P facing the photographer is positioned at an image-forming position I1 of the objective lens group.

The above-mentioned infrared projection system comprises the half mirror M disposed on an optical axis X of the finder optical system within the prism P and the LED 1 emitting an infrared ray toward the half mirror M. The infrared ray from the LED 1 is reflected by the half mirror M toward the objective lens group and then by the latter onto the object.

Also, as shown in FIG. 2, the second lens L2 and third lens L3 constituting the objective lens group are movable along the optical axis X such that the three lenses L1, L2, and L3 are distanced from each other and approach each other at the wide angle and telephotographic ends, respectively.

The following Table 3 shows radius of curvature R (mm) of each lens surface near the optical axis X, central thickness of each lens or air space between neighboring lenses d (mm), and refractive index N of each lens in this embodiment.

In Table 3, the numbers attached these marks R, d, and N successively increase from the object side.

As mentioned above, since the lens distances d2, d4, and d6 can change upon zoning, these distances at the wide angle and telephotographic ends are also shown Table 3.

TABLE 3

|   | R | d | N |
|---|---|---|---|
| 1 | 48.404 | 0.90 | 1.62041 |
| 2 | 7.653 | *1 |  |
| 3 | 9.313 | 1.40 | 1.51633 |
| 4 | 11.388 | *2 |  |
| 5 | 11.463 | 2.00 | 1.51633 |
| 6 | −12.462 | *3 |  |
| 7 | ∞ | 25.00 | 1.55919 |
| 8 | ∞ |  |  |
|   | wide angle end | telephotographic end |  |
| *1 | 6.19 | 0.75 |  |
| *2 | 7.45 | 0.75 |  |

In this embodiment configured as mentioned above, upon the zooming operation based on the movement of the second lens L2 and third lens L3, the focal length of the objective lens group can change from 9.95 mm to 26.56 mm, thereby yielding ratio of 2.67.

Also, in this embodiment thus configured, when the beam diameter of the infrared ray at the light-emitting portion of the LED 1 is 1 mm, it becomes about 30 cm and about 11 cm on the object distanced therefrom by 3 m at the wide angle and telephotographic ends, respectively.

Without being restricted to the foregoing embodiments, the distance measuring infrared projection system of the present invention may be appropriately modified in terms of its configurations concerning the infrared projection system, objective lens group, and ocular lens group.

What is claimed is:

1. A distance measuring infrared projection system comprising:

a half mirror with a predetermined infrared reflecting characteristic which is disposed between an ocular lens group of an inverse Galilean (albada type) finder and an object;

an infrared irradiating means which irradiates the half mirror with a predetermined infrared ray from outside of an optical axis of the lens group constituting said finder;

wherein said inverse Galilean (albada type) finder comprises:

an objective lens group, which has a negative refractive power as a whole, and at least two lenses having a variable distance there between so as to attain variable power, an ocular lens group, which has a positive refractive power as a whole, and a field frame disposed within or near said ocular lens group, whereby a concave surface of a lens constituting said objective lens group is configured so as to function as a half mirror for reflecting image light of said field frame toward said ocular lens group; and wherein said predetermined infrared ray irradiating said half mirror is projected onto said object by way of said half mirror and said objective lens group.

2. A distance measuring infrared projection system according to claim 1 wherein said field frame is formed on a surface of said ocular lens group facing an object so that the image frame is reflected by the concave surface of the lens constituting the objective lens group.

3. A distance measuring infrared projection system according to claim 2 wherein said surface of said ocular lens group is flat.

* * * * *